June 7, 1960 M. W. CURTIS 2,939,949

TRANSISTORIZED TRANSMIT-RECEIVE SWITCHING CIRCUIT

Filed June 3, 1958

INVENTOR.
MARVIN W. CURTIS.

BY

Harry M. Saragovitz
ATTORNEY

United States Patent Office 2,939,949
Patented June 7, 1960

2,939,949

TRANSISTORIZED TRANSMIT-RECEIVE SWITCHING CIRCUIT

Marvin W. Curtis, Eatontown, N.J., assignor to the United States of America as represented by the Secretary of the Army Filed June 3, 1958, Ser. No. 739,636

5 Claims. (Cl. 250—13)

Figure 1:
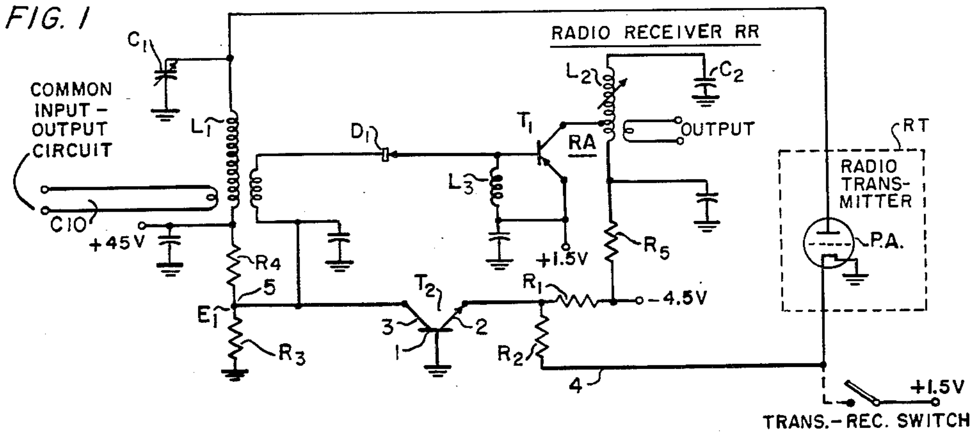

(Granted under Title 35, U.S. Code (1952), sec. 266)

The invention described herein may be manufactured and used by or for the Government for governmental purposes, without the payment of any royalty thereon.

The invention relates to two-way signal transmission systems and particularly to electronic switching circuits for providing directional control of signal transmission in such systems.

The invention is more specifically directed to, although not limited to, an electronic switching circuit for controlling the operation from a local or remote point of signal transmission equipment, such as a radio transmitter and a radio receiver, in a low-power radio communication system. Where a radio communication system employs a common antenna for transmitting the outgoing radio signals generated by the radio transmitter and receiving the incoming radio signals from a remote point, it is necessary to provide some means for effectively isolating the radio receiver from the radio transmitter during signal transmitting periods in order to protect sensitive detection equipment in the receiver from damage and prevent undue dissipation of the power of the transmitter in the receiver during such periods. In the past, this has been accomplished in connection with relatively high power radio and radar systems by the use of an automatic switching device comprising a gaseous discharge tube or spark-gap, connected across the input of the receiver and responsive to the relatively high amplitude outgoing signal energy to short circuit the input of the receiver and thus effectively to disconnect the receiver from the common antenna during signal transmitting intervals. Also, relays operated by push-to-talk switches have been used for a similar purpose in connection with certain radio communication systems.

A general object of the invention is to improve electronic switching apparatus used for the above-mentioned purpose in radio or other two-way signal transmission systems from the standpoint of reducing its power supply requirements, size and cost.

Another object is to protect the receiver in a two-way radio communication system from high amplitude outgoing radio signals during signal transmitting periods.

A more specific object is to effectively unload the output tank circuit of the power amplifier in the transmitter of a radio or other two-way signal communication system employing a common portion for transmitting outgoing signals and receiving incoming signals, such as a common transmitting and receiving antenna, during signal transmitting periods.

Other more specific objects are to protect a transistor amplifier used in the receiver of a two-way radio communication system from excessive A.-C. voltages and to prevent excessive power dissipation of the outgoing signal energy in the receiver during signal transmitting periods.

The electronic switching circuit in accordance with the invention for accomplishing the above objects utilizes as main elements, a diode, a transistor and a resistor network associated with these devices. The diode is connected between the input of the receiving amplifier in the receiver and the common transmitting and receiving antenna or other common input-output circuit for the transmitter and receiver of a radio or other two-way signal communication system, and is normally biased to a low impedance condition so as to permit substantially free transmission of incoming signals from the common circuit to the receiving amplifier. The transistor is normally biased to cause flow of collector current through it and the associated resistor network from associated voltage sources. When an energizing voltage is applied to the filament or other element of a power amplifier tube in the transmitter to condition the transmitter to transmit outgoing signals through the output tank circuit of its power amplifier to the common input-output circuit, a disabling biasing voltage is simultaneously applied to the transistor causing it to cut off and the flow of collector current to cease. This will result in a readjustment of the voltages in the associated resistor network such that the latter will apply an additional biasing voltage to the diode rectifier to cause it to become a high impedance for both D.C. and A.C. The diode in this condition will effectively isolate the input of the receiving amplifier from the output tank circuit of the transmitter power amplifier and the common input-output circuit. Because the coupling from the output tank circuit of the power amplifier of the transmitter is normally matched to a low input impedance for the receiving amplifier, due to this high impedance condition of the diode that tank circuit will be substantially unloaded during each signal transmitting period, only a very small amount of the outgoing signal power being dissipated in this coupling.

Figure 2:
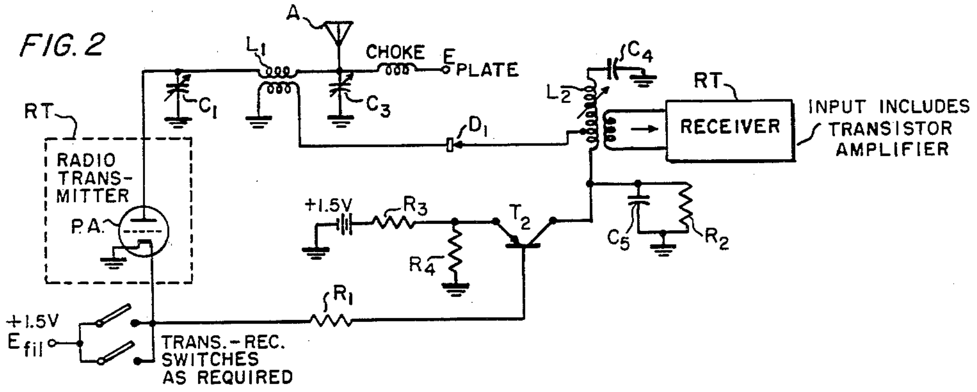
Figure 3:
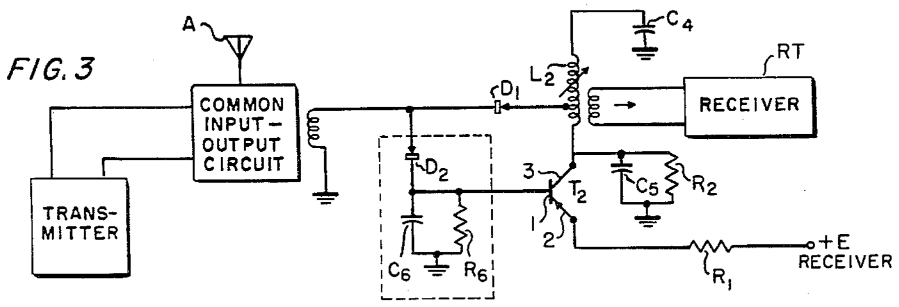

The various objects and features of the invention will be better understood from the following detailed description thereof when it is read in conjunction with the accompanying drawing in which the Figs. 1, 2 and 3 respectively show schematically alternative electronic switching arrangement in accordance with the invention for controlling the operation of the radio transmitter and radio receiver in a transistorized radio communication system.

Referring to Fig. 1 of the drawings, the low-power radio communication system shown therein includes a conventional radio transmitter RT, a conventional radio receiver RR and a common input-output circuit CIO, which may include a common transmitting and receiving antenna (not shown), inductively coupled to the output of the transmitter and to the input of the receiver. The radio transmitter RT, represented by the dashed line box so labeled, includes a power amplifier PA of which only the last vacuum tube stage including in its plate circuit a parallel-resonant output tank circuit consisting of the variable capacitor $C_1$ and the inductance coil $L_1$, inductively coupled to the circuit CIO, is illustrated. The radio receiver RR includes a transistorized receiving amplifier RA of which only the first amplifying stage including the transistor $T_1$ and a tuned output therefor including the tapped variable inductance coil $L_2$ and the capacitor $C_2$, is illustrated. The input of the transistor amplifying stage $T_1$ of the receiving amplifier RA is inductively coupled as shown to the inductance coil $L_1$ in the power amplifier output tank circuit $L_1C_1$ and to the common circuit CIO.

The electronic switching circuit of the invention for controlling the operation of the above-described radio communication system comprises for its main elements, the diode $D_1$, a transistor $T_2$, the resistors $R_1$ to $R_5$ and associated batteries for providing controlling voltages, The diode $D_1$, which may be of the metallic oxide or other suitable type, poled as shown, is connected in series with the coupling circuit between the input of the transistor amplifying stage $T_1$ of the receiving amplifier RA and the common input-output circuit CIO and the output tank circuit $L_1C_1$ of the transmitter, and is normally biased in the forward direction from a +1.5 volt battery through the choke coil $L_3$ to a low impedance condition, so as to permit incoming signals from the circuit CIO to pass through to the input of the amplifying transistor stage $T_1$ with little attenuation.

The transistor $T_2$ having the usual base electrode 1, emitter electrode 2 and collector electrode 3 is of the NPN type as indicated conventionally by the direction of the arrow associated with the emitter electrode 2. The current from the −4.5 volt source applied through the resistor $R_1$ to the emitter electrode 2 of transistor $T_2$ normally biases the transistor in the forward direction permitting normal flow of collector current therein. The emitter electrode 2 of transistor $T_2$ is also connected to a lead 4 which extends through a remote transmit-receive switch to a +1.5 volt source, which is the same source used for supplying energizing voltage to the filament of the power amplifier tube PA to render that tube and thus the transmitter operative to supply outgoing radio signals to the common input-output circuit CIO through the output tank circuit $L_1C_1$ of the power amplifier PA. The resistor $R_2$ in the lead 4 prevents the current through $R_1$ from being shunted through the filament of the power amplifier tube PA and thus not properly biasing transistor $T_2$ on receive.

The collector electrode 3 of the transistor $T_2$ is connected directly to the mid-point 5 between the two resistors $R_3$ and $R_4$ which are connected in series with each other between the low end of the inductance coil $L_1$ in the tuned tank circuit $L_1C_1$ and ground. A 45-volt voltage source is connected across the two resistors $R_3$ and $R_4$ in series in such manner that the positive terminal of that source is connected directly to the point of connection of the upper resistor $R_4$ to the low end of inductance coil $L_1$ and its negative terminal is connected through a ground connection to the lower end of the series resistor combination $R_4$, $R_3$. The mid-point 5 between the two resistors $R_3$ and $R_4$ is also connected to the cathode of the diode $D_1$ through the coil coupling the input of the receiving amplifier RA to the common input-output circuit CIO.

The circuit as above described operates as follows. In the normal receiving condition of the radio circuit the collector current flowing through transistor $T_2$ comes from two sources, through the resistor $R_4$ from the associated 45 volt source and through the diode $D_1$ from the associated +1.5 voltage source which biases the latter through the choke coil $L_3$ to the low impedance condition. The value of the resistor $R_4$ is selected large enough so that the current through it from the +45 volt source is very small compared to the current through the diode $D_1$. The normal low impedance condition of the diode $D_1$ so biased permits the incoming signals from the common input-output circuit CIO inductively coupled to that diode to freely pass through it to the amplifying transistor $T_1$ of the receiving amplifier RA.

In the transmitting condition of the radio system produced when the remote transmit-receive switch in the lead 4 is closed to apply a portion of the power from the associated +1.5 volt source to the filament of the receiving power amplifier tube PA, a portion of the voltage from that source is also applied through lead 4 and the resistor $R_2$ as a positive bias to the emitter electrode 2 of transistor $T_2$. This positive bias will cause the transistor $T_2$ to cut off and the flow of collector current to cease. Since no current is then drawn by the transistor $T_2$, the voltage $E_1$ at the mid-point between the resistors $R_3$ and $R_4$ is dependent on the relative resistance values of these resistors in parallel with the back resistances of the collector electrode 3 of $T_2$ and diode $D_1$. The resistor $R_3$ is provided in this circuit to prevent the voltage $E_1$ at point 5 from becoming larger than the maximum allowable collector voltage of $T_2$. The relative values of resistors $R_3$ and $R_4$ are selected such that the positive voltage on the cathode of the diode $D_1$ is much larger than that which is applied to the anode of $D_1$ by the associated +1.5 volt source. Thus, the diode $D_1$ for this condition becomes a high impedance for both D.C. and A.C. current. The coupling from the coil $L_1$ of the output tank circuit $L_1C_1$ of the transmitter power amplifier PA to the amplifying stage $T_1$ of the receiving amplifier RA is matched for low input impedance of transistor $T_1$; therefore, when the high impedance of $D_1$ is in series with this coupling and the matched load ($T_1$), very little power is dissipated in this coupling circuit. Since $D_1$ is also connected between the input of the receiving amplifier, transistor input stage $T_1$ and the coupling of tank circuit $L_1C_1$ which is now energized with the power of the outgoing radio signals, it effectively isolates this power and its associated R.-F. voltage from the transistor amplifying stage $T_1$.

The switching circuit of the invention as described above eliminates the need for an R.-F. relay for switching from a remote source. In the portable low-power, transistorized radio communication system for which the circuit of the invention was designed, small size and small power consumption are paramount factors. The smallest relay which would perform the same function as the electronic switching circuit arrangement of the invention as described above would be about twice as large as this circuit arrangement and would require from 10 to 20 times as much power for its operation. Also, a relay in a R.-F. circuit is usually considered undesirable.

Fig. 2 shows a modified electronic switching circuit adapted for use with radio communication sets requiring a relatively smaller degree of isolation between the receiver and transmitter than that for which the circuit of Fig. 1 was provided. In this type of set a certain amount of transmitter signal was required in the receiver to provide frequency control for the transmitter. The circuit of Fig. 1 could have provided this with a suitable shunt around the diode $D_1$ but, since complete cut-off of the diode was not required, it was simpler to eliminate one voltage supply and allow the diode to rectify and supply its own bias, as shown in Fig. 2. Also, the system of Fig. 2 allowed the use of a PNP type of switching transistor for $T_2$ in the electronic switching circuit.

In the system of Fig. 2, the inductance coil $L_1$ and the associated capacitors $C_1$ and $C_3$ constitute a common Pi-type input-output circuit for matching the impedances of the transmitter RT and receiver RT to that of the common antenna A. The inductance coil $L_2$ and associated capacitor $C_4$ form a receiver tuned circuit which operates to improve image rejection, and has nothing to do with the operation of the electronic switching circuit. The output of the transmitter RT need not be a tube PA as shown. It may comprise a transistor in which case the voltage $E_{fil}$ (+1.5 volts) used in Fig. 2 for a heating current source for the filament of the tube PA becomes a biasing voltage. This modification may be applied also to the system of Fig. 1. The transmitter RT need not be a low-power transmitter such as used in the system of Fig. 1. Also, in the system of Fig. 2 several diodes in series, or several switching circuits in series, may be employed to yield greater rejection, as required.

In the electronic switching circuit of Fig. 2, the resistors $R_3$ and $R_4$ form a voltage divider to establish a +1.5 volt potential, corresponding to the filament biasing voltage $E_{fil}$ for the power amplifier tube PA, on the emitter 2 of the PNP-type transistor $T_2$, shown in the figure in conventional manner, in the electronic switching circuit. Since the base 1 of the transistor $T_2$ has no applied voltage, the emitter 2 is more positive than the base 1 and therefore this junction conducts. The resistor $R_1$ allows some positive voltage to build up on the base 1 thereby biasing the collector electrode 3, which is connected to ground through the normal low impedance of the diode $D_1$, in the proper direction for transistor action. If the transistor $T_2$ is biased correctly, when the emitter 2 conducts, the collector electrode 3 also conducts. Therefore, since the emitter 2 is biased for conduction, collector current flows through the diode $D_1$ biasing it in the forward, normally low-impedance direction. This is the receive condition.

In the transmit condition, a potential, corresponding to $E_{fil}$, is established at the base 1 of the transistor $T_2$. The transistor $T_2$ is then cut off because of the reversed bias on the emitter-base junction, and therefore no emitter, base or collector current flows. At the same time, the outgoing A.-C. signal is applied to the diode $D_1$ from the transmitter RT. A portion of this signal is rectified by $D_1$ and charges up the associated capacitor $C_5$. The amount of the signal which passes through the diode $D_1$ to be rectified to maintain the reverse biasing voltage capacitor $C_5$ charged is largely dependent on the resistance value of the resistor $R_2$ shunting that capacitor. The resistance value of resistor $R_2$ is selected to regulate the amount of passed signal, a portion of which passes on to the input of the receiver RT through the associated inductive coupling. The diode $D_1$ controlled in the manner described provides transmission of the incoming signal from the antenna A during signal receiving intervals with little attenuation, while effectively isolating the receiver RR from the transmitter RT during outgoing signaling intervals.

The need for supplying a direct-connected switch can be eliminated as shown in the alternative switching circuit illustrated in the system of Fig. 3. Although in this circuit, the transistor $T_1$ is shown as a PNP-type transistor, it can be of the NPN-type if the direction of the diodes $D_1$ and $D_2$ and the receiver voltage polarities are reversed.

The electronic switching circuit of Fig. 3 works in a manner similar to that described for the circuit of Fig. 2 above in signal receiving intervals except that the received signal, usually in microvolts, is not large enough to be rectified by $D_1$ and thus to cause the transistor $T_2$ to switch. The diode $D_2$ will be biased in a direction which is the reverse of that of $D_1$ by the received voltage, and, therefore, will not shunt the received signal to ground. The values of $R_1$, $R_2$ and $R_6$ will be adjusted, diode $D_1$ and transistor current on receive, and will determine the level of signal which will switch the circuit. On transmit, the diode $D_2$ will rectify some signal and, if the rectified signal is large enough, will charge capacitor $C_5$ to a voltage larger than that on the emitter 2 of transistor $T_2$ thereby switching transistor $T_2$ and allowing diode $D_1$ to rectify and charge capacitor $C_5$ as well as bias itself to cut-off as in the circuit of Fig. 2.

The electronic switching circuit of Fig. 3 since it is automatic, lends itself to a further application which has been a problem in the design of radio receivers with transistor or other extremely sensitive input circuits; that is, the protection of the input circuit elements, including transistors, under the condition of being near a high power (25 watts or over) transmitter even though on a different frequency, or on the same frequency, such as a tank commander system with a transistorized receiver where it may be next to, or approximately 500 yards away from, the antenna of the tank radio transmitter which radiates 25 to 50 watts. The circuit of Fig. 3 would automatically block enough signal during signal transmitting intervals to prevent damage to sensitive equipment, such as crystal detectors, in the receiver input, and yet will be adjusted to allow passage of enough signal for communications.

Various modifications of the circuits illustrated and described which are within the spirit and scope of the invention will occur to persons skilled in the art.

What is claimed is:

1. In combination with a radio system including a radio transmitter, a radio receiver and a common circuit coupled to the output of said transmitter and to the input to said receiver, for transmitting outgoing radio signals received from said transmitter and for receiving and transmitting to said receiver incoming radio signals received from a remote point, an electronic switching circuit for controlling the operation of said transmitter and said receiver, including a diode connected effectively in series with the coupling between said common circuit and said receiver and normally biased to a low impedance condition permitting incoming signals to pass from said common circuit to the input of said receiver with little attenuation during each incoming signal period, a transistor with an associated collector circuit, a resistance network at least a portion of which is included in said collector circuit and connected to said diode, a power source connected across said network, means normally biasing said transistor to cause collector current to flow from said source through its collector circuit and said portion of said network and a normally open switch which when operated to the closed condition causes said transmitter to be operatively energized to transmit outgoing radio signals to said common circuit and a disabling bias to be applied to said transistor stopping the flow of collector current through said resistance network in said collector circuit, the cessation of flow of collector current in said network causing the redistribution of the voltages therein to apply an additional bias to said diode such as to make it a relatively high impedance, thereby effectively isolating said receiver from said common circuit and the output of said transmitter during each outgoing signal transmitting period.

2. In combination with a two-way signal transmission system including a signal transmitter, a signal receiver and a common input-output circuit coupled to the input of said receiver and the output of said transmitter, for receiving and transmitting incoming signals to said transmitter and transmitting outgoing signals generated by said receiver, an electronic switching circuit for directionally controlling signal transmission in said system, including a diode connected effectively in series with the coupling circuit between said common circuit and the input of said receiver, said diode being normally biased so that it operates to provide a low impedance in said coupling circuit and thus normally allows transmission of incoming signals therethrough to the input of said receiver with little attenuation thereof, a transistor having a collector circuit, a resistance network with an associated power supply source in said collector circuit, and also connected to said diode, means normally biasing said transistor so as to cause flow of collector current in said collector circuit through said resistance network, switching means which when operated causes said transmitter to be operatively energized to supply outgoing signals to said common circuit, and simultaneously causes a disabling bias to be applied to said transistor stopping the flow of collector current through said network, the resistors in said network and the associated power supply source being so proportioned and located with respect to said diode that the cessation of flow of collector current in that network will cause it to apply a biasing voltage opposite to the normal bias to said diode such as to make it provide a high impedance in said coupling circuit, thereby effectively isolating the input of said receiver from said transmitter and said common circuit and reducing the dissipation of the transmitter power in said receiver during outgoing signal transmission intervals to a small value.

3. The combination of claim 2, in which said transmitter is a radio transmitter and includes a vacuum tube power amplifier with a tuned tank circuit in the output stage thereof, inductively coupled to said common input-output circuit, said receiver is a radio receiver and includes a receiving amplifier with a transistor amplifying device at least in the input stage, which is inductively coupled to said common input-output circuit and to said tuned tank circuit of said power amplifier, said diode includes an anode and a cathode, and is normally biased to the low impedance condition by a voltage on the anode positive with respect to the cathode, said transistor includes a base, an emitter and a collector electrode, the operation of said switching means operatively energizes the transmitter and causes the application of a disabling positive bias to the emitter of said transistor such as to stop the flow of collector current in its collector circuit, said diode is changed to the high impedance condition by raising the cathode voltage in a positive direction through said resistor network due to the redistribution of the voltages therein when the flow of collector current ceases, and the coupling between said tank circuit and the input to said transistor amplifying device of said receiving amplifier is normally matched for low input impedance of the transistor therein so that when said diode provides a high impedance in series with this coupling and its matched load, very little of the transmitter output power is absorbed in this coupling.

4. The combination of claim 2, in which said diode has a cathode and an anode, said resistance network comprises a pair of resistors connected in series with each other, said power supply source is connected across said pair of resistors in such manner as to operate as the source of collector current for said transistor when it is biased to allow flow thereof in said collector circuit, the mid-point of said pair of resistors being connected to the collector electrode of said transistor, and through a portion of said coupling circuit to the cathode of said diode, the voltage at said mid-point between said pair of resistors due to said power supply source connected thereacross when the flow of collector current in said collector circuit ceases being such as to apply a sufficient positive bias to the cathode of said diode to cause it to provide a high impedance to both D.C. and A.C. in said coupling circuit, one of said pair of resistors in said network being provided to prevent the voltage at the mid-point between said pair of resistors from becoming larger than the maximum allowable collector voltage of said transistor.

5. The combination of claim 1, in which during signal transmitting periods said diode is self-biased by rectification of a portion of the outgoing A.-C. signal supplied thereto from said transmitter, said transistor of the PNP switching type including an emitter, a collector and a base electrode, said resistor network includes a pair of series-connected resistors operating as a voltage divider, said transistor being normally biased by the application of a biasing potential to its emitter through said voltage divider to allow the flow of current in the collector circuit which biases said diode in the forward direction to make it of low impedance during incoming signal periods.

References Cited in the file of this patent

UNITED STATES PATENTS

| | | |
|---|---|---|
| 2,012,433 | Myers | Aug. 27, 1935 |
| 2,410,641 | Evans | Nov. 5, 1946 |
| 2,772,388 | Brath et al. | Nov. 27, 1956 |
| 2,774,866 | Burger | Dec. 18, 1956 |

UNITED STATES PATENT OFFICE

CERTIFICATE OF CORRECTION

Patent No. 2,939,949 June 7, 1960

Marvin W. Curtis

It is hereby certified that error appears in the printed specification of the above numbered patent requiring correction and that the said Letters Patent should read as corrected below.

Column 6, lines 47 and 48, for "transmitter" read -- receiver --; line 49, for "receiver" read -- transmitter --.

Signed and sealed this 13th day of December 1960.

(SEAL)
Attest:

KARL H. AXLINE
Attesting Officer

ROBERT C. WATSON
Commissioner of Patents